United States Patent [19]

Areaux et al.

[11] Patent Number: 4,721,457
[45] Date of Patent: Jan. 26, 1988

[54] METHOD AND APPARATUS FOR CLEANING AND DRYING METAL CHIPS

[75] Inventors: Larry D. Areaux, Portage; Robert H. Dudley, Richland, both of Mich.

[73] Assignee: Pre-Melt Systems, Inc., Kalamazoo, Mich.

[21] Appl. No.: 55,785

[22] Filed: May 28, 1987

Related U.S. Application Data

[63] Continuation-in-part of Ser. No. 866,795, May 23, 1986.

[51] Int. Cl.⁴ ............................................. F27B 15/00
[52] U.S. Cl. ..................... 432/58; 34/57 E; 432/14
[58] Field of Search .................. 432/58, 14, 13; 34/57 E

[56] References Cited

U.S. PATENT DOCUMENTS

| | | | |
|---|---|---|---|
| 4,018,262 | 4/1977 | Jaschinski et al. | 34/57 E |
| 4,089,119 | 5/1978 | Heinze | 34/57 E |
| 4,190,415 | 2/1980 | Singrey | 432/58 |
| 4,480,392 | 11/1984 | Luthi | 432/58 X |

*Primary Examiner*—Edward G. Favors
*Attorney, Agent, or Firm*—Gordon W. Hueschen

[57] ABSTRACT

There is disclosed a process for producing dried and cleaned metal chips by entraining metal chips in a gas, introducing the gas into a cyclone separator having a wall heated to fluid-vaporizing temperature by combustion effected in a surrounding chamber, purging fluid from said chips, exhausting hot gases and exiting dried metal chips from said separator, conducting hot gaseous products of combustion from the combustion chamber to a continuous centrifuge, extracting extractable fluid from starting metal chips, which may be previously uncleaned and/or unwashed, in the centrifuge, entraining the chips in the hot gaseous products of combustion introduced into the centrifuge, and conducting the gaseous products with entrained chips from the continuous centrifuge to the cyclone separator, thereby providing an essentially closed system. The combustion chamber may be a part of an afterburner furnace and hot gases entraining vaporized oil exhausted from the cyclone separator may by recycled and employed as fuel for the combustion chamber. This particular disclosure emphasizes provision in the system of hot water and/or steam from either an external source or from a water jacket around the cyclone separator, preferably together with solvent and/or detergent, and a final chip drying step wherein the drying is effected using products of combustion which are enroute back to the continuous centrifuge. Apparatus for carrying out the said process is also disclosed.

50 Claims, 3 Drawing Figures

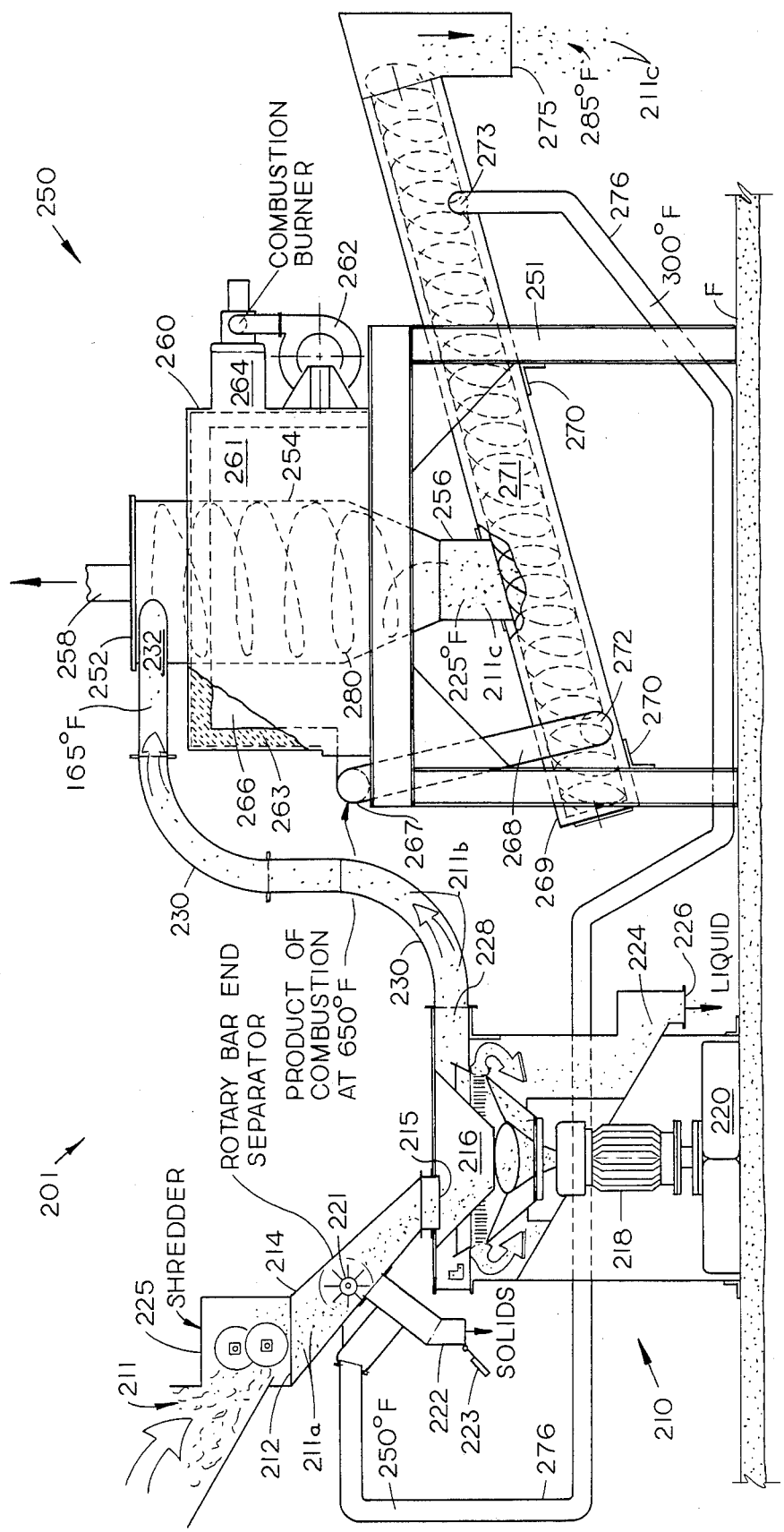

METHOD AND APPARATUS FOR CLEANING AND DRYING METAL CHIPS

The present invention is a continuation-in-part of our prior-filed copending application Ser. No. 866,795, filed May 23, 1986.

FIELD OF INVENTION

Preparation of dry metal chips, especially scrap metal chips, illustratively brass and aluminum, for further use, as by reintroduction into a molten mass of metal of which said chips are formed. Drying of said chips by removal of fluid thereon, whether aqueous or organic, e.g., hydrocarbon, in nature, or both. Method and apparatus for so doing. This invention: Drying and cleaning of chips so that they do not require cleaning prior to entry into the present apparatus and process; final drying of chips as effected in a jacketed rotary drum dryer or jacketed screw conveyor heated by products of combustion from the combustion chamber surrounding a heated cyclone separator at a previous step in the process.

PRIOR ART

With the value of metal chips, especially brass and aluminum chips, constantly on the increase, and with scrap metal chips now valued at between twenty and fifty cents per pound, the recovery and utilization of metal chips, but especially scrap metal chips, has become more and more advantageous from an economic standpoint. It is today possible to clean metal chips chemically in the presence of a detergent and then vaporize excess water or burn off the oil from chips thermally in a controlled combustion apparatus such as a rotary drum type. This provides essentially dry metal chips when a low order of cost effectiveness can be tolerated or absorbed, but unfortunately essential "dryness" is necessary in all cases in view of the fact that metal chips cannot be employed in a moisture-containing state and hydrocarbon or other cutting-oil fluids adhering thereto must also be removed in order for such metal chips to be capable of reuse. Although such prior-art apparatus and procedure as previously mentioned have been the best available up to the present time, they have proved relatively uneconomic in practice, and other alternative procedure and equipment previously available for carrying out the same have also proved uneconomic and unsatisfactory, especially upon a larger scale such as presently required to meet the demands of industry for larger and larger quantities of chips which can be reclaimed and recycled for further use.

The method and apparatus of the present invention provide long-awaited improvements in both process and apparatus for the removal of either or both of moisture and oily contaminants from metal chips on an economic basis at the very commencement of their reentry into the stream of commerce. The present invention also permits the introduction of starting chips into the present apparatus and process without precleaning if desired, and further providing a final drying step and apparatus therefor which utilizes hot products of combustion from the combustion chamber surrounding a cyclone separator employed in a previous step of the process for effecting heating in the final drying step.

OBJECTS OF THE INVENTION

It is accordingly an object of the present invention to provide a new and improved process for the cleaning of metal chips, especially scrap metal chips, to remove moisture and/or oily residual contaminants therefrom. It is another object of the invention to provide such a process which is economically feasible and in which maximum utilization of energy available from the contaminated chips themselves is employed in the process of cleaning and drying the same. Another object of the invention is the provision of such a process which is particularly adaptable to starting chips which are prewashed and substantially oil free whereas, in another preferred embodiment of the invention, the process is particularly adapted to the employment of starting chips which have not previously been washed with water plus detergent or the like and which accordingly contain both water and oil residues. Still another object of the invention is the provision of a superior method for the provision of cleaned and dried metal chips suitable for employment in industrial processes whereby scrap metal chips may advantageously reenter the stream of commerce in an advantageous form and under more advantageous economic conditions than previously available. Still an additional object of the invention is the provision of apparatus which is admirably suited for employment in the said process. Yet an additional object of the invention is the provision of a unique combination of apparatus with unique communication conduitry or circuitry therebetween which is in turn uniquely and advantageously designed for use in carrying out the process of the invention. Still additional objects of the present invention are to provide apparatus and procedure which does not demand prewashing of the starting chips, but which may b applied to relatively dirty chips, but which may be applied to relatively dirty chips because cleaning is also effected during the process, as well as a novel final chip drying step and apparatus therefor which utilizes products of combustion from a previous step for heating in and of the same. Other objects of the invention will become apparent hereinafter, and still other objects will be apparent to one skilled in the art to which this invention pertains.

SUMMARY OF THE INVENTION

The present invention comprises the employment of a source of hot water and/or steam, which may be a water jacket surrounding the combustion chamber of cyclone separator means utilized for drying chips in a late stage of the process, for the washing and cleaning of starting chips introduced at an early stage in the process, preferably at or ahead of a continuous centrifuge or "wringer" which may be employed in the process, with associated valving and conduitry, together with an optional source of solvent and/or detergent for embodiment thereof in said steam and/or hot water, for purposes of effecting cleaning of the starting chips from the dirt and or hydrocarbon or other oil or grease usually associated therewith, as an integral part of the overall process. In addition, the invention comprises the employment of a jacketed rotary drum dryer or jacketed screw conveyor for a final drying of the chips before exit from the process, with heating of the rotary drum or screw conveyor being effected by the utilization of hot products of combustion exited from a combustion chamber surrounding the cyclone separator means employed in a previous stage of the process.

The invention, inter alia, otherwise comprises the following:

In a metal chip drying apparatus, the combination comprising cyclone separator means having inlet means for the entry into said cyclone separator means of gas-entrained metal chips, outlet means for the exit of dried chips from said cyclone separator means, outlet means at the opposite end of said cyclone separator means for the exit of exhaust gases therefrom, combustion chamber means about the outer wall of said cyclone separator means for the combustion of fuel therein, inlet means into said combustion chamber means for the entry of heat and flame thereinto, burner means associated with said inlet means into said combustion chamber means and with fuel source means, and outlet means for exit of gaseous products of combustion from said combustion chamber means; such a combination additionally comprising water-jacket means about said combustion chamber means having cold-water inlet means and hot-water outlet means; such a combination also comprising continuous centrifuge means including chip inlet means and discharge outlet means for exit of gas-entrained chips from said centrifuge means, together with associated conduit means, which associated conduit means is connected from said discharge outlet means to said inlet means into said cyclone separator means; such a combination also comprising conduit means associated with said combustion chamber outlet means and in communication with said chip inlet means of said continuous centrifuge means, thereby forming a circuit between said combustion chamber means through said outlet means thereof and continuous centrifuge means via said chip inlet means of said continuous centrifuge means and thence out of said continuous centrifuge means via said discharge outlet means thereof and associated conduit means into said cyclone separator means via said inlet means thereof; such a combination also comprising rotary airlock means ahead of said chip inlet means into said continuous centrifuge means; such a combination also comprising automatic self-unloading solids separator means at a point in said circuit between said rotary airlock means and said chip inlet means of said continuous centrifuge means; such a combination also comprising rotary airlock means downstream from said dry chip outlet means of said cyclone separator means; such a combination wherein the said combustion chamber means is a part of afterburner furnace means and including return conduit means for conducting exhaust gases from said outlet means of said cyclone separator means into said combustion chamber means; such a combination also comprising rotary airlock means ahead of said chip inlet means of said continuous centrifuge means and also comprising rotary airlock means down stream from said chip outlet means of said cyclone separator means, and such a combination also comprising automatic self-unloading solids separator means in said circuit between said rotary airlock means located ahead of said chip inlet means of said continuous centrifuge means and said chip inlet means.

Also, a process for the production of dry metal chips by the removal of fluid therefrom comprising the following steps:

entraining fluid-containing metal chips in a gas, providing a cyclone separator having a wall, said wall comprising internal and external surfaces, heating a substantial portion of said wall of said cyclone separator to fluid-vaporizing temperature, introducing said gas with entrained fluid-containing chips into said cyclone separator, causing said fluid-containing chips to contact the internal surface of said heated wall of said cyclone separator thereby purging and vaporizing flid from said chips, exhausting hot gases including entrained vaporized fluid purged from said chips from one end of said cyclone separator, and exiting dried metal chips from the other end of said cyclone separator; such a process wherein said fluid-containing metal chips are moisture-containing metal chips or oil-containing metal chips; such a process wherein said metal chips are moisture-containing metal chips and wherein the interal surface of said wall of said cyclone separator is heated to a temperature sufficient to vaporize said moisture, and including the step of exhausting gases including entrained vaporized moisture from said chips at one end of said cyclone separator and preferably wherein the internal surface of the wall of the cyclone separator is heated to a temperature between about 250° and about 450° F.; such a process wherein said metal chips are oil-containing metal chips and wherein the internal surface of said wall of said cyclone separator is heated to a temperature sufficient to vaporize said oil, and including the step of exhausting gases including entrained vaporized oil from said chips at one end of said cyclone separator and preferably wherein the internal surface of the wall of the cyclone separator is heated to a temperature between about 900° and about 1100° F.; such a process wherein said heating of the wall cyclone separator is effected by combustion in a combustion chamber surrounding said cyclone separator, and such a process wherein said combustion is in a combustion chamber which is a part of an afterburner furnace; such a process wherein said afterburner furnace is fueled at least in part by exhaust gases including entrained vaporized oil purged from said chips in said cyclone separator and including the step of conducting said exhaust gases to said afterburner furnace; and such a process comprising the step of providing a water-jacket surrounding said combustion chamber for purposes of heating water in said water-jacket and conducting said heated water to a chip-washing step at or near the beginning of the process. Moreover, such a process wherein extractable fluid is removed from the starting metal chips centrifugally in a continuous centrifuge before introduction of the gas containing entrained chips into the cyclone separator, and wherein gas entraining said metal chips from said continuous centrifuge is conducted from said continuous centrifuge into said cyclone separator; such a process including the step of utilizing the combustion of exhaust gases including entrained vaporized oil purged from said chips for heating of said wall of said cyclone separator; such a process including the step of exhausting gaseous products of combustion from said combustion chamber and conducting the same to and introducing the same into said continuous centrifuge for the heating and entrainment of starting metal chips therein; such a process wherein the temperature of the gaseous products of combustion conducted to said continuous centrifuge from said centrifugal separator is between about 220° and about 300° F. for water-containing chips and between about 450° and about 750° F. for oil-containing chips. Finally a process for the production of dry metal chips by the removal of fluid therefrom comprising the following steps: entraining fluid-containing metal chips in a gas, providing a cyclone separator having a wall, said wall comprising internal and external surfaces, heating a substantial portion of said wall of said cyclone separator to fluid-vaporizing temperature, introducing said gas with entrained fluid-containing chips into said cyclone separator, causing said fluid-containing chips to contact the internal surface of said heated wall of said cyclone separator thereby purging and vaporizing fluid from said chips, exhausting hot gases including entrained vaporized fluid purged from said chips from one end of said cyclone separator, and exiting dried metal chips from the other end of said cyclone separator, heating said wall of said cyclone separator to fluid-vaporizing temperature by effecting combustion in a combustion chamber surrounding said wall of said cyclone separator, conducting the hot gaseous products of combustion from said combustion chamber to and introducing them into a continuous centrifuge, extracting extractable fluid from starting metal chips centrifugally in said continuous centrifuge, entraining said metal chips in said hot gaseous products of combustion introduced into said continuous centrifuge from said combustion chamber, and conducting said gaseous products with entrained chips froms said continuous centrifuge to and introducing the same into said cyclone separator, thereby providing an essentially closed system; and such a process wherein said chips contain oil and wherein said combustion chamber is a part of an afterburner furnace and wherein the hot gases include entrained vaporized oil and are exhausted from said cyclone separator and recycled back and employed as fuel for said combustion chamber of said afterburner furnace.

THE DRAWINGS

Reference is now made to the drawings, wherein.

Figure 1:
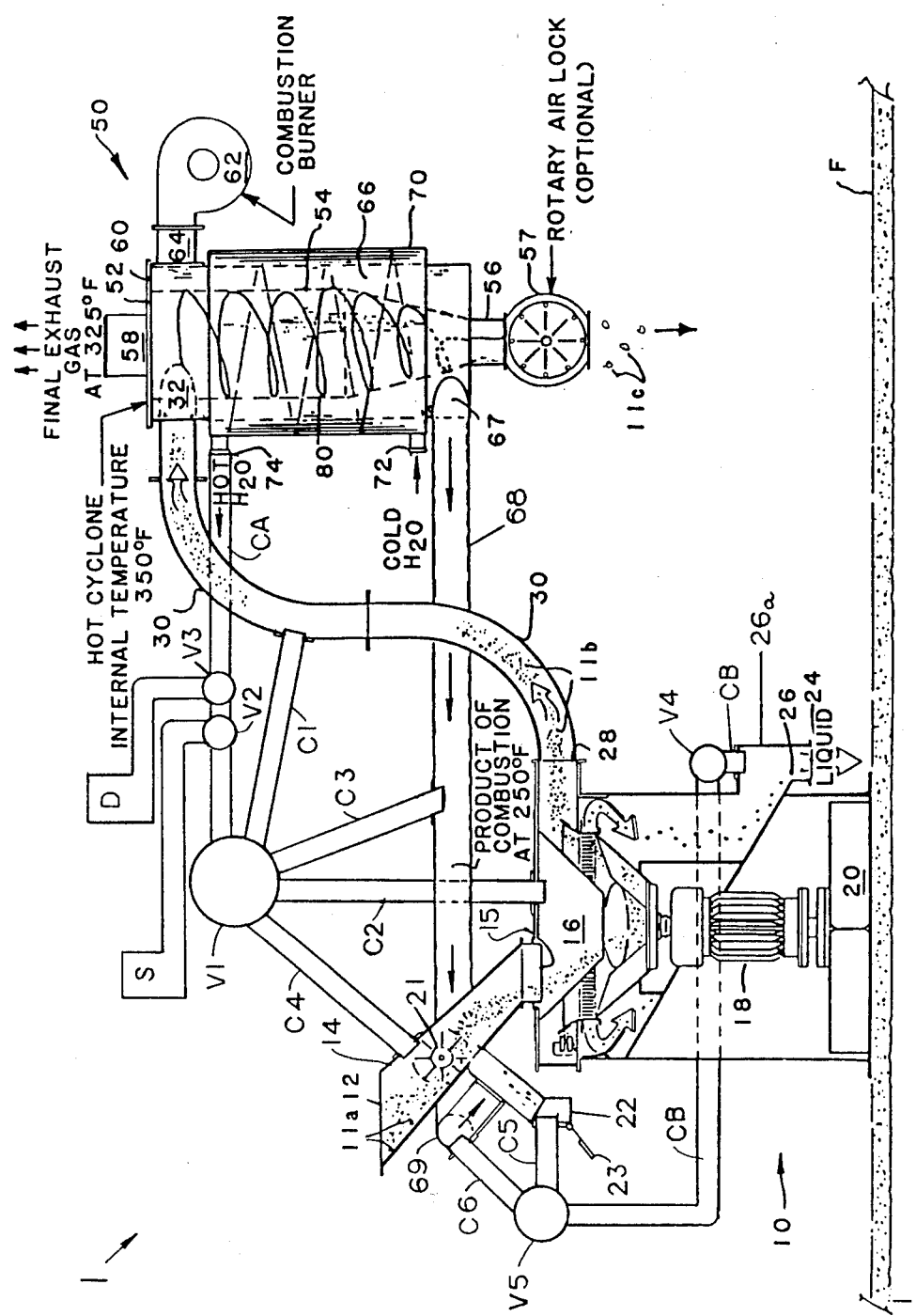
FIG. 1 is a side elevational view of apparatus according to the invention which may be employed in carrying out the method of the invention shown partially schematically and partially in section for purposes of convenience and simplicity.
Figure 2:
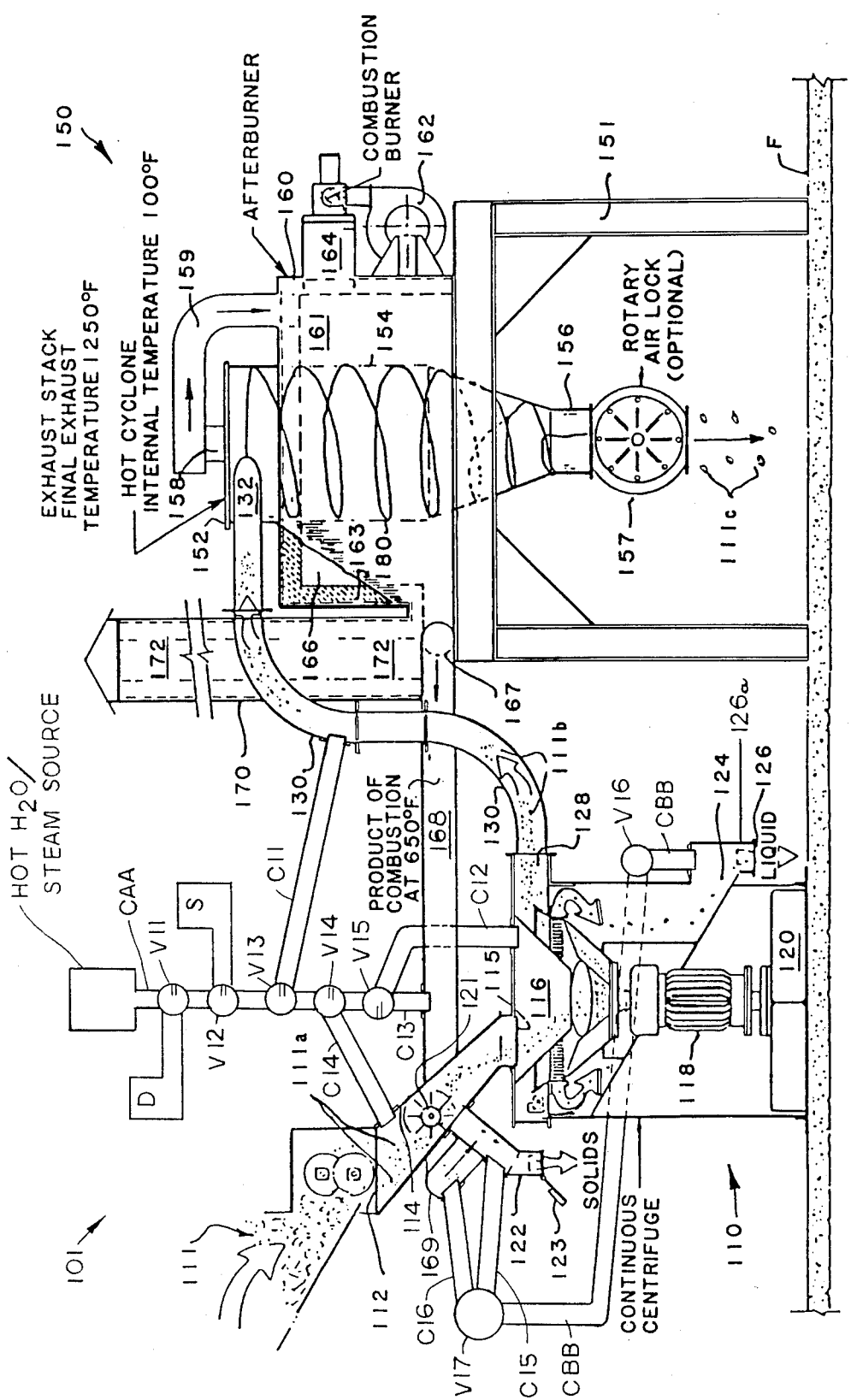
FIG. 2 is a side elevational view of another embodiment of apparatus according to the invention which may be employed in carrying out another embodiment of the method of the invention, once again being shown partially schematically and partially in section for purposes of convenience and simplicity.

FIG. 3 is a side elevational view of another embodiment of apparatus according to the invention which may be employed in carrying out a further embodiment of the method of the invention, being a combination of certain aspects of FIGS. 1 and 2 as modified to provide final chip drying and apparatus therefor, again being shown partially schematically and partially in section for purposes of convenience and simplicity.

DETAILED DESCRIPTION OF THE INVENTION

The present invention, in both its method and apparatus aspects, will be more readily understood from the following detailed description, particularly when taken in conjunction with the drawings, in which all of the significant parts are numbered and wherein the same numbers, or numbers differing by 100, are usually used to identify the same parts throughout.

According to the present invention, the chips introduced into the process and apparatus of the invention do not necessarily require prewashing or precleaning. The apparatus and process of the invention are accordingly designed to effect this step in addition to drying of the chips treated, the step of cleaning and washing of the chips being conveniently provided by the provision of a hot water and/or steam source, which may be built into the equipment itself or provided from outside, conveniently along with a source of detergent and/or solvent, for cleansing of the starting chips of whatever dirt or impurities as well as hydrocarbon or other oils or grease which may be carried on the surface thereof as they enter the process and apparatus of the invention. In addition, in another embodiment, as representatively shown in FIG. 3, a further final drying of the chips is provided, along with means for such drying, the same being effected by utilization of hot products of combustion from a previous step in the process.

In FIG. 1 is illustrated apparatus and process uniquely designed for the production of dried metal chips which may or may not have been prewashed. At the left of the drawing, unwashed chips 11 (not shown) may be but are in this case not necessarily subjected to washing in a usual washing unit for the washing of metal chips with hot water and detergent or the like which contain in addition the normal oil, dirt, and other debris ordinarily associated with such chips, especially of the scrap metal variety. Due to the unique nature of the apparatus and procedure of the present invention this prewashing or precleaning step may be, and usually is, foregone, and the cleaning carried out as part of the present process. The washed or unwashed and preshredded chips 11a are introduced into chip entry means 12 of continuous centrifuge or wringer unit 10 such as Reclamet models having particular adaptability to the removal of moisture and/or oil from the surface of metal chips including their models TD3000, TD4000, and TD5000, shown generally at 10. Chip entry means 12 leads into inclined duct 14 emptying into the usual spinner bowl 16 for centrifugal separation of fluids from chips to the extent possible in such a device. Centrally of inclined duct 14 is located rotary bar end separator 21 which doubles as an airlock under usual operating conditions. Communicating with inclined duct 14 is air intake and solids separation exit 22, in close justaposition to rotary bar end separator and airlock 21 to permit air to enter the wringer unit because of the suction or vacuum created therein while, at the same time, permitting bar ends or parts larger than a prescribed maximum to leave the inclined duct 14 as directed by rotary bar end separator 21 to exit 22. Weighted damper 23 monitors exit 22, the damper opening when the separated solids collected at exit 22 reach a predetermined minimum for temporary opening of the damper.

The usual spinning or centrifugal bowl 16, for centrifugal separation of liquids from solids in the heated continuous centrifuge unit 10, is rotated by associated drive means 18 mounted on base 20 which in turn is situated upon floor F. Liquid 24, consisting essentially of water, aqueous detergent solution, oil, or the like, which is wrung out of the chips by the continuous centrifuge unit, exits therefrom via chip wringer exit 26 whereas the wrung chips 11b, still carrying entrained moisture and whatever other liquid not wrung therefrom in continuous centrifuge unit 10, in an amount of usually approximately two (2) percent by weight, exit said unit via exit pipe 28 and enter, along with entraining gases, essentially steam, an entry conduit 30 communicating with separatory unit entry means 32.

The cooperating heated separatory unit, shown generally at 50, comprises cyclone separator proper 52 having an external wall 54 and surrounding combustion chamber 66, of mild or stainless steel or the like, which is in turn surrounded by an external water jacket 70, possibly glass or otherwise lined, as is conventional in the art of water-jacketing. The external water jacket 70 has a cold water inlet 72 and a hot water/steam outlet 74, from which hot water and/or steam may conveniently be conducted back into the process as further disclosed hereinafter. Combustion means 60 comprises combustion chamber 66 surrounding cyclone separator external wall 54 and combustion burner 62, fueled with oil or gas from a source not shown, and communicating via hollow burner mounting means 64 with internal combustion chamber 66 for directing heat and flame thereinto.

Upon entry of wrung chips 11b entrained in gases (mainly steam) via separation unit entry means 32, solids comprising wrung chips 11b follow spiral path 80 internally in contact with and along the hot wall 54 of separator 52 wherein and whereby they are dried by their contact with the internal surface of separator external wall 54, which is heated by internal combustion chamber 66 surrounding said separator wall 54 to a temperature of about 350° F., and finally pass out of said separator 52 via separator solids exit means 56 and through optional but preferred rotary airlock 57 as clean and dry chips 11c for collection and reuse.

Final exhaust gases, at or about 325° F., pass out of the separator unit at the top thereof via separator gas exit means 58 and may be allowed to escape to the atmosphere or be captured and disposed of in an afterburner or baghouse or the like if desired.

Simultaneously, products of combustion from combustion chamber 66 in the combustion means 60 surrounding separator wall 54 pass out of said combustion chamber via exit means 67 at a temperature of approximately 250° F. and are conducted through combustion chamber exit conduit 68. The hot combustion gases then enter inclined duct 14 of the continuous centrifuge unit 10 through gaseous combustion product entry and return means 69 from which point they are drawn with chips via chip inlet 15 into the continuous centrifuge unit 10 by means of the considerable vacuum or suction provided therein. Hot gas entry and return means 69 feeds into air intake and solids separation exit 22 which in turn leads directly into duct 14 of continuous centrifuge unit 10. Upon entering into duct 14 and spinner bowl 16, the gaseous products of combustion resulting from the combustion effected in combustion means 60 assist in the vaporization of fluid materials carried by the starting metal chips 11a and finally exit centrifuge unit 10 at exit 28 along with wrung chips 11b.

In the adaptation of the present invention, conduit CA is provided between hot water and/or steam exit port 74, whereby hot water and/or steam exits from water jacket 70. This conduit CA leads to valve V1, whereby distribution to other sections of the system is effected by means of conduitry involving conduits C1, C2, C3, and C4. In addition, a source of detergent D and a source of solvent S are provided and so located with appropriate connecting conduitry so as to enter conduit CA, when desired, through valves V2 and V3. Thus, when it is known that the starting chips contain grease, or hydrocarbon or other oil, the solvent supply source S can be activated through its connecting conduitry and valve V2 whereas, when extremely dirty, but not necessarily grease-, hyrocarbon- or other oil-containing chips are involved, detergent source D can be activated, in turn providing detergent into the system through its connecting conduitry and valve V3 into main conduit CA ahead of main distribution valve V1. Alternatively, both sources may be activated for supply of both solvent and detergent into the system when desired. Valve V1 may comprise a single or a plurality of options connecting it between conduit CA and one or more of conduits C1, C2, C3, and C4.

When selected, conduit C1 returns the hot water and/or steam together with any entrained solvent and/or detergent directly to separatory unit entry means 32 via entry conduit 30 through an appropriate opening therein. This is a preferred return conduit and a preferred manner of operation, inasmuch as it brings the injected hot water and/or steam and/or solvent and/or detergent into contact with the chips entering the cyclone separator 52 with a minimum of circuitry, conduitry and valving, important considerations when it is desired to minimize equipment size and costs.

When conduit C2 is selected, the conduitry feeds hot water and/or steam, with or without accompanying detergent and/or solvent, through conduit C2 directly into the spinner bowl 16 of continuous centrifuge 10 through a suitable opening provided in the cover thereof.

When conduit C3 is selected, the hot water and/or steam enters conduit 68, which is the conduit provided for products of combustion exiting the combustion chamber 66 surrounding centrifugal separator 52 via exit port 67, and is thereupon transported, along with any entrained and/or dissolved solvent and/or detergent, through hot gas entry and return means 69 into air intake and solids separation exit 22 which in turn leads directly into duct 14 of continuous centrifuge unit 10.

In case conduit CA is selected, the steam and/or hot water and any entrained or dissolved detergent and/or solvent proceeds directly into duct 14 of continuous centrifuge unit 10. Any or all of these options may be selected or preselected by the operator and effected either manually or automatically.

Alternatively or additionally, further conduitry CB is provided at a suitable point in chip wringer housing 26a above chip wringer exit 26, in turn being activated by means of valve V4 which permits the steam rising from the exit housing 26a to be sucked into a further extension of the conduitry CB and further conduitry identified as C5 and C6, either into solids separation exit 22 or gaseous combustion product entry and return means 69, as selected by activation of valve V6, this additional conduitry ensuring that all of the possible hot water and/or steam generated in the system is utilized for the chip cleaning operation, as will be apparent to one skilled in the art from the foregoing explanation.

In a second embodiment of the invention, as illustrated in FIG. 2, the metal chips subjected to the process and apparatus of the invention are previously unwashed chips, which definitely contain not only residual dirt and moisture is not made for the internal procurement and utilization of hot water, as in the embodiment of FIG. 1, but economic and other factors may dictate the selection of the previously-described embodiment, or vice-versa, since more drastic energy measures and greater capital outlay are required for the drying of chips which have not previously been subjected to any washing process, hence the afterburner unit in this embodiment.

In FIG. 2, the heated separator unit is shown generally at 150, the heated continuous centrifuge or wringer unit at 110, and the entire combination of apparatus at 101 (cf. 1 in FIG. 1).

As shown in FIG. 2, unwashed chips 111, replete with the usual moisture, oil, grease, dirt, and other associated debris, pass along inclined duct 114 leading into the usual centrifugal or spinner bowl 116 after having entered at chip entry means 112 following subjection to a shredder 125, illustratively a high-torque low-speed hydraulically-driven turnings shredder such as Premelt Shredder Model 2436 from Premelt Systems, Inc., Kalamazoo, Mich., USA. As shredded chips 111a proceed in inclined duct 114 they contact rotary bar end separator 121 which doubles as an airlock under usual operating conditions. Airlock 121 again cooperates with solids separating exit 122 to direct bar ends and metal chips above a predetermined maximum size to exit from the inclined trough 114 prior to entering into the centrifuge proper at chip inlet 115, exit 122 being monitored by weighted damper 123 which opens when the separated solids collected at exit 122 reach a predetermined minimum for temporary opening of the damper. Spinner bowl 116 is again rotated by associated drive means 118, once again mounted on base 120 in turn situated upon floor F. The concentration of residual liquid on chips 111b upon leaving centrifuge or wringer 10 is approximately two (2) percent by weight, most of which is oil of a hydrocarbon or other combustible nature.

Once again the continuous centrifuge unit shown generally at 110 is, as shown, associated with separation unit shown generally at 150. Separation unit 150 comprises cyclone separator proper 152 including cyclone separator exterior wall 154 and separated solids exit means 156 through which separated solids exit via optional but preferable rotary airlock 157. At the top of cyclone separator 152 is separated gas exit 158 through which hot gases exit from the separator 152. Metal chips 111b entering the cyclone separator 152 follow spiral path 180 in contact with the interior surface of heated cyclone separator exterior wall 154 en route to separated solid exit means 156.

Surrounding separator 152 is afterburner furnace 160 comprising an external housing 161 of mild or stainless steel or the like, as is conventional in the furnace art, which houses an internal combustion chamber 166 surrounding the cyclone separator exterior wall 154. The external housing 161 of the afterburner furnace 160 is provided with a refractory lining 163, as is also conventional in the furnace art. Combustion burner 162, fueled with oil or gas from a source not shown, provides heat and flame directed into internal combustion chamber 166 via hollow burner mounting 164 whereby burner 162 is mounted upon external housing 161 of afterburner furnace 160 and through which mounting burner 162 communicates with the internal combustion chamber 166. Hot exit gases leaving cyclone separator 152 via gas exit means 158, in this embodiment comprising vaporized hydrocarbon and other combustible oils, are cycled by separated gas return conduit 159 communicating with internal combustion chamber 166 back into combustion chamber 166 where they provide suitable fuel for the after-burner furnace 160.

The metal chips 111b entering the cyclone separator 152 via entry means 132 from entry conduit 130 are heated to an extremely high temperature of approximately 1000° F. during their passage through cyclone separator 152 while describing spiral path 180 along and in contact with the interior surface of extremely hot exterior wall 154 of separator 152, finally passing out of separator solids exit means 156 and through optional but preferable rotary airlock 157 from which the cleaned and dried chips 111c exit and may be recovered for further use.

The entire separator unit 150, as shown, including cyclone separator proper 152 and afterburner furnace 160 and associated conduits, along with combustion burner 162, are all supported on support means 151, in turn mounted upon floor F.

The hot gases, which are products of combustion of the combustion which takes place in the combustion chamber 166 of afterburner furnace 160, are led from internal combustion chamber 166 via combustion chamber exit means 167 into combustion chamber exit conduit 168 where the products of combustion in gaseous form at a temperature of approximately 650° F., controlled if necessary by employment of dilution air, finally enter inclined duct 114 via hot gas return inlet 169, which communicates with separated solids exit 122, whereupon they are conveyed into the continuous centrifuge or wringer unit 110 together with chips 111a entering from shredder 125 past rotary bar end separator 121 and along inclined duct 114 to assist in the cleaning and drying of the new batch of chips 111a in the continuous centrifuge or wringer 110 and the spinner bowl 116 thereof into which the hot return gases and chips are suctioned via chip inlet 115 by means of the vacuum created therein.

A controlled portion of the products of combustion exiting from the combustion chamber 166 after leaving combustion chamber exit means 167 is vented to the atmosphere through exhaust means in the form of exhaust stack 170 via flue 172 communicating with combustion chamber exit means 167, the final exhaust temperature of those products exiting through exhaust stack 170 being on the order of 1250° F. It will be understood by one skilled in the art that the height of the exhaust stack must be sufficient, e.g., 20 or 30 feet, to cause an upward flow of gases sufficient to create a negative pressure or natural draft on the products of combustion exiting the combustion chamber through exit 167 or, alternatively, that such negative pressure or natural draft can be established by use of an exhaust fan (not shown).

According to this modification of the present invention, a hot water and/or steam source is provided, as shown, in this case from outside the existing system, since no water jacket surrounding the combustion chamber 166 is provided.

This external source, together with suitable conduitry CAA, detergent source D and solvent source S, along with appropriate valving V11 and V12, provides the source of hot water and/or steam and/or detergent and/or solvent for introduction into the system. Main conduit CAA is effectively connected by valves V11 and V12 for introducing the hot water and/or steam and, when desired, entrained and/or dissolved solvent and/or detergent, directly through valve V13 and conduit C11 into entry conduit 130 and thence together with chips into heated cyclone separator 152 through entry port 132. Alternatively or concurrently, valve V13 is closed (or also kept open) with respect to conduit C11 and opened to provide a flow of hot water and/or steam and/or entrained and/or dissolved solvent and/or detergent as far as valve V14, where it may be diverted through conduitry C14 into inclined duct 114 through an appropriate opening therein, or allowed to proceed to valve V15, from whence it may be permitted to proceed through conduit C12 and/or C13 either or both into combustion product return conduit 168 and- /or into spinner bowl 116 through an appropriate opening therein. Alternatively, all of these valves may be programmed to open for entry of the hot water and/or steam into the system through all of the ports or only a selected number of them, either manually or automatically, as will again be apparent to one skilled in the art. Once again, conduitry CBB is provided to communicate with an appropriate opening in chip wringer exit housing 126a which, together with appropriate valving V16 and V17 and associated conduitry C15 and/or C16, once again conducts steam from this secondary source into one or both of solids separating exit 122 and hot gas return outlet 169, and thence into inclined duct 114 and directly into continuous centrifuge or wringer unit 110 and the spinner bowl 116 thereof, thereby once again utilizing the introduced hot water and/or steam and energy to the maximum possible extent.

As to either of the foregoing adaptations or modifications according to the invention, it will be apparent that the starting chips need not be clean or prewashed or precleaned, inasmuch as the hot water and/or steam provided according to the present invention effects cleaning as an integral part of the process and system before drying and expulsion of the chips therefrom, so that greasy chips or chips laden with hydrocarbon oil or the like can readily be cleaned by the introduction of solvent into the system along with the hot water and/or steam, and that normal dirt, moisture, and other impurities not of an oily or greasy nature can readily be removed by the introduction of detergent into the system along with the hot water and/or steam, or that both may be employed where desired or required, so that in effect the invention has now provided, within limits of feasibility, a completely self-contained chip cleaning and drying apparatus, system, and process which eliminates the necessity of prewashing or precleaning of the starting chips except in the most unusual or extraordinary cases.

In the embodiment shown in FIG. 3, the source of hot water and/or steam, detergent, and solvent, together with the necessary circuitry involved for introducing the same into the system, is not shown, but is of the same nature and type as shown in FIG. 2 when and if embodied in the system and employed in the process. FIG. 3 shows in abbreviated form at 201 a combination or system substantially like that of FIG. 2, involving continuous centrifuge 210, with its inclined duct 214 and rotary bar end separator 221, through which shredded chips 211a proceed in the usual manner. Airlock 221 cooperating with solids separating exit 222 for directing bar ends and metal chips above a predetermined maximum size to exit from the inclined trough 214 prior to entering centrifuge proper at chip inlet 215, together with monitoring weighted damper 223, are also visible. Spinner bowl 216 rotated by associated drive means 218 is again mounted on base 220 in turn situated on floor F. The continuous centrifuge unit 210 is again associated with a separation unit shown generally at 250, comprising cyclone separator proper at 252 including cyclone separator exterior wall 254 and separated solids exit means 256 through which separated solids 211c exit. Exhaust gases exit separator 252 through gas exit 258. Metal chips 211b entering separator 252 follow the spiral path 280 in contact with interior surface of separator exterior wall 254 enroute to separated solids exit means 256. Surrounding separator 252 is furnace 260 comprising external housing 261 housing internal combustion chamber 266 surrounding separator exterior wall 254 and again provided with refractory lining 263. Combustion burner 262 is fueled with oil or gas from a source not shown and provides heat and flame directed into internal combustion chamber 266 via hollow burner mounting 264 whereby burner 262, mounted upon external housing 261 of furnace 260, communicates with internal combustion chamber 266. Hot exit gases leave cyclone separator 252 via gas exit means 258. If desired, they may again be cycled by a separated gas return conduit communicating with internal combustion chamber back into the combustion chamber itself, where they provide further fuel for the after burner furnace, all as shown in FIG. 2.

Metal chips 211b entering separator 252 via entry means 232 from entry conduit 230 are heated during passage through separator 252 while describing spiral path 280 and finally pass out of separator solids exit means 256, the entire separator unit 250 being again supported on support means 251 in turn mounted upon floor F.

Hot gases which are products of combustion in the combustion chamber 266 are led from internal combustion chamber 266 via combustion chamber exit means 267 via conduit 268 back to inclined duct 214 via hot gas return inlet 269 from whence they are conveyed into the continuous centrifuge or wringer unit 210 together with chips 211a.

However, in this embodiment, combustion chamber exit conduit 268 is interrupted by a jacketed screw conveyor or jacketed rotary drum dryer 269, in either case jacketed with a housing 271 of sheet metal or the like and provided with inlet port 272 and exit port 273 for the introduction of products of combustion respectively thereinto and exit therefrom enroute via a continuation 272 of combustion chamber exit conduit 268 back to continuous centrifuge or wringer unit 210. The jacketed screw conveyor or jacketed rotary drum dryer 269 is generally of approximately twenty (20) feet in length, so that the dwell time of chips therein is approximately five (5) minutes. Dwell time of the chips therein may be controlled by controlling the rate of rotation of the rotary drum dryer or the screw conveyor 269, which is rotated about its longitudinal axis as is conventional in the art by conventional means (not shown), all as is well known in the art. Thus, after exit of dried or partially dried chips 211c from separator solids exit means 256, they are either introduced directly or conveyed by suitable conveying means such as a duct or conduit (not shown) into the lower end of jacketed screw conveyor or jacketed rotary drum dryer 269, also mounted by mounting means 270 upon support means 251, wherein they undergo a more or less spiral path of travel ending at chip exit 275. Thus, the already partially-dried chips or dried chips 211c are subjected to a further and final drying step or procedure involving the employment of hot products of combustion from combustion chamber exit means 267 via combustion chamber conduit 268 and the thus-heated jacket 271 of screw conveyor or rotary drum dryer 269, and are finally discharged therefrom at chip exit 275, the final drying of the chips involving only an intermediate use of the existing hot products of combustion from combustion chamber 266 with an absolute minimum of additional equipment and operational expense. Upon exiting from jacket outlet port 273 via conduct 276 continuation of combustion chamber exit conduit 268, the still relatively hot products of combustion are returned to the continuous centrifuge or wringer unit 210 via the conduitry and ductwork previously explained.

As will be apparent to one skilled in the art although, in the first embodiment of the process of the invention as illustrated in FIG. 1, where the main object may be to remove water or moisture from the chips (as when starting chips are relatively clean or where substantially all of the oil has been removed previously, as by a washing step), the temperature in the cyclone separator is given as about 350° F., the final exhaust gases may have a temperature of about 325° F., and the gaseous products of combustion recycled back to the continuous centrifuge unit are indicated as having a temperature of about 250° F., considerably broader temperature ranges may be involved. Illustratively, in the embodiment of FIG. 1, the temperature inside of the cyclone separator will generally range between about 250° and 450° F., and the products of combustion returned to the continuous centrifuge or wringer will generally be at a temperature between about 220° F. and 300° F., whereas the temperature of the exhaust gases leaving the separator will generally be in the range of about 225° to 425° F.

In contrast, in the embodiment of FIG. 2, where (and whenever) the object is generally to remove both water and hydrocarbons and other oils, greases, and other impurities from the chips, and without previous cleaning, the temperature will generally be considerably higher. For example, within the cyclone separator the temperature will be rather carefully controlled, especially when aluminum chips are involved, but will generally be between about 900° F. and 1100° F., usually between about 950° F. and 1050° F. The temperature of the products of combustion recycled to the continuous centrifuge or wringer will generally be at a temperature within the range of about 450° F. to about 750° F., as may be readily controlled by the employment of dilution air to the extent required, whereas the temperature in the exhaust stack may range between about 1150° and 1450° F.

With the apparatus as illustrated in FIG. 3, the chips 211c exiting separator 252 at exit means 256 are usually at a temperature of approximately 225° F., whereas the products of combustion conveyed by combustion chamber exit conduit 268 from combustion chamber exit port 267 are generally at a temperature of approximately 650° F., at which temperature they enter entry port 272 of jacketed screw conveyor or rotary drum dryer 269. Upon emerging from jacket 271 at exit port 273, the temperature of these products of combustion is generally approximately 300° F. and, upon return to inclined duct 214 and continuous centrifuge or wringer 210, approximately 250° F. Thus, in the embodiment of FIG. 3, products of combustion inherent in the system and process of the invention are employed in a final drying of the chips as an intermediate stage in the utilization thereof. The integrity of the overall system and process is not diminished except to the extent that the temperature of the products of combustion upon return to the continuous centrifuge stage of the process is somewhat reduced in contrast to the temperature level retained when the final drying stage, and the apparatus whereby the same is effected, are omitted.

Whenever cooling of the combustion gases conducted from the combustion chamber to the continuous centrifuge or wringer is required, a minimum quantity of oxygen-containing dilution air should be used or other cooling means, e.g., a heat exchanger in the conduit 68, 168, or 268, are recommended. Although in no case should the temperature employed be any higher than required for efficient and economic operation, as will be readily understood by one skilled in the art, the temperature ranges employed in the embodiment of FIG. 2 are generally considerably higher than the temperature ranges employed in the embodiment of FIG. 1 when, according to the process of FIG. 1, only a minor degree of chip cleaning is involved or, e.g., when only residual water is to be purged or expelled from the chips, as when most of the hydrocarbon and other oil has been removed in a washing step preceding entry of the chips into the process whereas, when there is no prewashing or precleaning, or only a minimum thereof, as is usual in the embodiment of FIG. 2, both water and hydrocarbon as well as other oils and impurities and contaminants are being removed directly in the process and the hydrocarbon oils and the like are available for use as fuel and can be employed by recycling the effluent gases back into the afterburner furnace as shown in FIG. 2.

The amount of residual water, plus possibly some small amount of detergent, solvent, or whatever in solution, on the chips as they emerge from the continuous centrifuge or wringer unit in the embodiment of FIG. 1, especially when a prewash is employed, is generally about two percent (2%) by weight whereas, according to the embodiment of FIG. 2, and whenever no prewash is employed, the amount of water and hydrocarbon and other oils remaining on the chips upon their exit from the continuous centrifuge unit will be in approximately the same range but with a very considerably higher proportion of oil to total residual liquid in contrast to the insignificant amount of oil which remains on the chips upon exit from the continuous centrifuge or wringer unit when operating with prewash, which is not necessary according to the invention but which, when employed, is most conveniently associated with the process and the apparatus of the embodiment of FIG. 1.

Thus, according to the invention, a novel process for the production of dry metal chips by the removal of fluid therefrom is provided whereby dry chips can be obtained either from cleaned or uncleaned starting metal chips, but wherein precleaning or prewashing is not a necessary prerequisite, the apparatus and method employed in the separation unit being by itself novel and valuable and the apparatus and process as employed in the separation unit, in combination with the apparatus and process as employed in the continuous centrifuge unit, with communicating interconnections, being all the more industrially advantageous and valuable, since none of the possibly available fuel carried by or on said starting chips is wasted, being rather employed by means of communication and recirculation means as described in the foregoing to minimize the amount of new energy which must be provided in the process for the effective drying of the starting metal chips of whatever nature and with whatever contaminants might be present.

An important aspect of the present invention is that the starting chips may be introduced into the process in previously uncleaned or unwashed state, or with any reasonable degree of contamination, without the necessity of prewashing or precleaning, and be adequately cleaned and dried within the present system and process, due to the provision of hot water and/or steam, either from an independent source or from a source within the apparatus employed in the process according to the invention, if desired together with solvent and/or detergent, depending upon the original contaminations as determined to exist upon the chips as introduced into the process. The additional feature of the present process, involving final drying of the chips in drying equipment, utilizing as heating agent the products of combustion from the combustion chamber surrounding the cyclone separator used in the preceding step for drying of the chips, is an additional advantageous aspect of the invention, especially when the hot products of combustion are recycled through the final drying apparatus and back into the process at or just ahead of the continuous centrifuge stage where initial wringing of the chips is effected.

As far as the apparatus of the invention, the apparatus involved in the separation unit of the invention constitutes an entirely new and novel approach to the drying of metal chips and, while independently valuable, is of course of even greater industrial value and advantage in combination with the continuous centrifuge unit, with which it is connected according to the invention by various communicating cycling and recycling conduit circuitry for purposes of obtaining the maximum possibly energy and heat for drying of the chips and for purging liquid from the chips themselves while minimizing the input of new energy into the process.

The additional apparatus employed for introduction of the steam and/or hot water, either from an independent source or from the water jacket surrounding the combustion chamber used for heating of the cyclone separator, with or without additional sources of detergent and/or solvent, requires only minimal equipment or apparatus adaptations, as does the conduitry necessary for heating of the jacketed rotary drum dryer or screw conveyor for final drying of the chips with hot products of combustion which are then desirably recycled back into the circuit at the continuous centrifuge stage.

Accordingly, both the apparatus and the process of the present invention constitute an important and advantageous step forward in the art of providing dry metal chips, especially scrap metal chips, for reuse and reintroduction into the stream of commerce.

Whereas, in this specification and claims, reference is frequently made to "metal chips", this is to be understood as encompassing metal chips of various almost unlimited proportions, configurations, and dimensions, but particularly to include small pieces and/or particles, likewise of extremely variable dimensions, and in general the term "metal chips" is employed herein as having the usual meaning to one skilled in the art, being inclusive not only of parts, pieces, particles, and fragments of the usual type from scrap, but also previously unused metal in standard or odd configurations remaining from previous molding, extruding, casting, rolling, or like metal processing operations, and it goes without saying that inconveniently large pieces can be reduced in size in any convenient manner and employed as metal chips and that, accordingly, any suitable metal, whether scrap or otherwise, can be converted into chips and employed in the process and apparatus of the invention, whether new metal or previously used metal, including even and especially new and used aluminum sheet and can scrap, when it is determined that such further processing into new metal is required or desired by the operator, provided, however, that in all cases such metal scraps are of suitably small dimensions so that they can be employed efficiently in the separator unit and/or continuous centrifuge or wringer unit according to the invention without causing damage to or plugging of the apparatus employed, this ordinarily being taken care of according to the skill of the art by preshredding the chips to suitable manageable and utilizable dimensions.

* * *

It is therebyseen from the foregoing that the objects of the present invention have been accomplished and that a novel, efficient, and economic process for the drying and cleaning of metal chips has been provided, as well as novel apparatus for use in carrying out the said process, and whereby all of the previously-mentioned advantages have been attained and the shortcomings of the prior art have been obviated.

According to the present invention, the ability to start with previously unwashed or unclean chips and to effect both efficient cleaning or washing and drying thereof in a single unitary process if of course of great advantage, especially when relatively low temperatures can be employed, and the concept of finally drying the chips by means of equipment utilizing as heating means the products of combustion resulting from the heating of the cyclone separator in the previous step, with final recycling of the products of combustion back into the process at or about the continuous centrifuge stage, goes far toward providing a finished and completely dried chip in a unitary process of maximum simplicity and involving only minimal economic outlay.

Although the preferred embodiments of the invention have been illustrated in the accompanying drawings and described in the foregoing description, it is to be understood that the invention is not limited to the embodiments disclosed or to the exact details of operation or exact compounds, compositions, methods, or procedures shown and described, since the invention is capable of numerous modifications, rearrangements, and substitutions of parts and elements and other equivalents, whether metallurgical, chemical, or mechanical, without departing from the spirit or scope of the invention, as will readily be apparent to one skilled in the art, wherefore the present invention is to be understood as limited only by the full scope which can be legally accorded the appended claims.

We claim:

1. In a metal chip cleaning and drying apparatus, the combination comprising cyclone separator means having a wall, said wall being of heat-conducting material and having inner and outer surfaces, and having inlet means for the entry into said cyclone separator means of gas-entrained metal chips, outlet means for the exit of dried chips from said cyclone separator means, outlet means at the opposite end of said cyclone separator means for the exit of exhaust gases therefrom, combustion chamber means about the outer surface of the wall of said cyclone separator means for the combustion of fuel therein, inlet means into said combustion chamber means for the entry of heat and flame thereinto, burner means associated with said inlet means into said combustion chamber means and with fuel source means, outlet means for exit of gaseous products of combustion from said combustion chamber means, and source means for hot water and/or steam plus conduit means for conveyance of said hot water and/or steam into said cyclone separator means via said cyclone separator chip inlet means.

2. The combination of claim 1, comprising water-jacket means about said combustion chamber means having cold-water inlet means and hot-water/steam outlet means, and conduit means for conveying steam and/or hot water from said hot-water/steam outlet means to said cyclone separator means via said cyclone separator chip inlet means.

3. The combination of claim 1, also comprising continuous centrifuge means including
chip inlet means and
discharge outlet means for exit of gas-entrained chips from said centrifuge means, together with associated conduit means, which associated conduit means
is connected from said discharge outlet means to said inlet means into said cyclone separator means,
and including conduit means for conveying said steam and/or hot water from said steam and/or hot water source means into said continuous centrifuge means whereby said stream and/or hot water is conveyed by said associated conduit means from said discharge outlet means of said continuous centrifuge means to said cyclone separator means via said cyclone separator chip inlet means.

4. The combination of claim 3, also comprising
conduit means associated with said combustion chamber outlet means and
in communication with said chip inlet means of said continuous centrifuge means,
thereby forming a circuit between said combustion chamber means through said outlet means thereof and continuous centrifuge means via said chip inlet means of said continuous centrifuge means and
thence out of said continuous centrifuge means via said discharge outlet means thereof and associated conduit means into said cyclone separator means via said inlet means thereof,
and including conduit means for introduction of said hot water and/or steam into both said continuous centrifuge means and into said cyclone separator means via said cyclone separator chip inlet means.

5. The combination of claim 4, also comprising rotary airlock means ahead of said chip inlet means into said continuous centrifuge means.

6. The combination of claim 5, also comprising automatic self-unloading solids separator means at a point in said circuit between said rotary airlock means and said chip inlet means of said continuous centrifuge means.

7. The combination of claim 4, also comprising water-jacket means about said combustion chamber means having cold-water inlet means and hot-water/steam outlet means,
and including conduit means for conveying steam and/or hot water from said hot-water/steam outlet means to said cyclone separator means via said cyclone separator chip inlet means.

8. The combination of claim 5, also comprising rotary airlock means downstream from said dry chip outlet means of said cyclone separator means.

9. The combination of claim 1, wherein the said combustion chamber means is a part of afterburner furnace means and including return conduit means for conducting exhaust gases from said outlet means of said cyclone separator means into said combustion chamber means.

10. The combination of claim 4, wherein said combustion chambermeans is a part of afterburner furnace means and including return conduit means for conducting exhaust gases from said outlet means of said cyclone separator means into said combustion chamber means.

11. The combination of claim 3, 7, or 10, also comprising rotary airlock means ahead of said chip inlet means of said continuous centrifuge means and also comprising rotary airlock means down stream from said chip outlet means of said cyclone separator means.

12. The combination of claim 11, also comprising automatic self-loading solids separator means in said circuit between said rotary airlock means located ahead of said chip inlet means of said continuous centrifuge means and said chip inlet means.

13. A process for the production of cleaned and dried metal chips by the removal of fluid and other impurities therefrom comprising the following steps:
entraining fluid-containing metal chips in a gas,
providing a cyclone separator having a wall, said wall being of heat-conductive material and comprising internal and external surfaces,
applying heat to a substantial portion of the external surface of said wall of said cyclone separator to produce a fluid-vaporizing temperature on the internal surface of said wall,
introducing said gas with entrained fluid-containing chips into said cyclone separator,
providing a source of hot and/or steam and introducing said hot water and/or steam along with said gas with entrained fluid-containing chips into said cyclone separator,
causing said fluid-containing chips to contact the internal surface of said heated wall of said cyclone separator thereby
purging and vaporizing fluid from said chips,
exhausting hot gases including entrained vaporized fluid purged from said chips from one end of said cyclone separator, and
exiting dried metal chips from the other end of said cyclone separator.

14. The process of claim 13, wherein said fluid-containing metal chips are moisture-containing metal chips.

15. The process of claim 13, wherein said fluid-containing metal chips are oil-containing metal chips.

16. The process of claim 14, wherein said metal chips are moisture-containing metal chips and wherein the internal surface of said wall of said cyclone separator is heated to a temperature sufficient to vaporize said moisture, and including the step of exhausting gases including entrained vaporized moisture from said chips at one end of said cyclone separator.

17. The process of claim 15, wherein said metal chips are oil-containing metal chips and wherein the internal surface of said wall of said cyclone separator is heated to a temperature sufficient to vaporize said oil, and including the step of exhausting gases including entrained vaporized oil from said chips at one end of said cyclone separator.

18. The process of claim 16, wherein the internal surface of the wall of the cyclone separator is heated to a temperature between about 250° and about 450° F.

19. The process of claim 17, wherein the internal surface of the wall of the cyclone separator is heated to a temperature between about 900° and about 1100° F.

20. The process of claim 13, wherein said heating of the external surface of the wall of the said cyclone separator is effected by combustion in a combustion chamber surrounding said cyclone separator.

21. The process of claim 20, wherein said combustion is in a combustion chamber which is a part of an afterburner furnace.

22. The process of claim 21, wherein said afterburner furnace is fueled at least in part by exhaust gases including entrained vaporized oil purged from said chips in said cyclone separator and including the step of conducting said exhaust gases to said afterburner furnace.

23. The process of claim 20, comprising the step of providing a water-jacket having a hot water and/or steam outlet and surrounding said combustion chamber for purposes of heating water in said water-jacket and conducting said hot water and/or steam from the hot-water/steam outlet of said water-jacket to said cyclone separator along with the fluid-containing metal chips entrained in a gas entering thereinto.

24. The process of claim 16, wherein extractable fluid is removed from the starting metal chips centrifugally in a continuous centrifuge before introduction of the gas containing entrained chips into the cyclone separator, and wherein gas entraining said metal chips from said continuous centrifuge is conducted from said continuous centrifuge into said cyclone separator, and wherein said hot water and/or steam is introduced into said continuous centrifuge and then, along with the gas entraining said metal chips from said continuous centrifuge, is introduced into said cyclone separator.

25. The process of claim 17, wherein extractable fluid is removed from the starting metal chips centrifugally in a continuous centrifuge before introduction of the gas containing entrained chips into the cyclone separator, and wherein gas entraining said metal chips from said continuous centrifuge is conducted from said continuous centrifuge into said cyclone separator, and wherein said hot water and/or steam is introduced into said continuous centrifuge and then, along with the gas entraining said metal chips from said continuous centrifuge, is introduced into said cyclone separator.

26. The process of claim 25, including the step of utilizing the combustion of exhaust gases including entrained vaporized oil purged from said chips for heating of said wall of said cyclone separator.

27. The process of claim 24, including the step of exhausting gaseous products of combustion from said combustion chamber and conducting the same to and introducing the same into said continuous centrifuge for the heating and entrainment of starting metal chips therein.

28. The process of claim 25, including the step of exhausting gaseous products of combustion from said combustion chamber and conducting the same to and introducing the same into said continuous centrifuge for the heating and entrainment of starting metal chips therein.

29. The process of claim 27, wherein the temperature of the gaseous products of combustion conducted to said continuous centrifuge from said centrifugal separator is between about 220° and about 300° F.

30. The process of claim 28, wherein the temperature of the gaseous products of combustion conducted to said continuous centrifuge from said centrifugal separator is between about 450° and about 750° F.

31. A process for the production of dry metal chips by the removal of fluid therefrom comprising the following steps:
entraining fluid-containing metal chips in a gas,
providing a cyclone separator having a wall, said wall comprising internal and external surfaces,
heating a substantial portion of said wall of said cyclone separator to fluid-vaporizing temperature,
introducing said gas with entrained fluid-containing chips into said cyclone separator,
causing said fluid-containing chips to contact the internal surface of said heated wall of said cyclone separator thereby
purging and vaporizing fluid from said chips,
exhausting hot gases including entrained vaporized fluid purged from said chips from one end of said cyclone separator, and
exiting dried metal chips from the other end of said cyclone separator,
heating said wall of said cyclone separator to fluid-vaporizing temperature by effecting combustion in a combustion chamber surrounding said wall of said cyclone separator,
conducting the hot gaseous products of combustion from said combustion chamber to and introducing them into a continuous centrifuge,
extracting extractable fluid from starting metal chips centrifugally in said continuous centrifuge,
entraining said metal chips in said hot gaseous products of combustion introduced into said continuous centrifuge from said combustion chamber, and
conducting said gaseous products with entrained chips from said continuous centrifuge to and introducing the same into said cyclone separator, thereby providing an essentially closed system,
providing a source of hot water and/or steam and introducing the same together with entrained chips into said cyclone separator either directly or by introducing said hot water and/or steam into said continuous centrifuge and thence into said cyclone separator along with metal chips conducted from said continuous centrifuge into said cyclone separator.

32. The process of claim 31, wherein said chips contain oil and wherein said combustion chamber is a part of an afterburner furnace and wherein the hot gases include entrained vaporized oil and are exhausted from said cyclone separator and recycled back and employed as fuel for said combustion chamber of said afterburner furnace.

33. The process of claim 31, wherein a source of detergent and/or solvent is provided and wherein at least one of said detergent and solvent are introduced into said system along with said hot water and/or steam.

34. the process of claim 32, wherein a source of solvent is provided and wherein solvent is introduced into said system along with hot water and/or steam.

35. The combination of claim 1, comprising also a source of detergent and/or solvent and conduit means for introducing one or more of said detergent and said solvent into the conduit means of said combination.

36. The combination of claim 2, comprising also a source of detergent and/or solvent and conduit means for introducing one or more of said detergent and said solvent into the conduit means of said combination.

37. The combination of claim 3, comprising also a source of detergent and/or solvent and conduit means for introducing one or more of said detergent and said solvent into the conduit means of said combination.

38. The process of claim 13 including the steps of providing a source of detergent and/or solvent and introducing one or more of detergent and solvent into the process along with said hot water and/or steam.

39. The process of claim 13, wherein said fluid-containing metal chips contain solid impurities and wherein detergent is introduced into said process along with said hot water and/or steam.

40. The process of claim 13, wherein said fluid-containing metal chips are grease or oil-containing metal chips and wherein a solvent is introduced into said process along with said hot water and/or steam.

41. The process of claim 13, comprising the step of providing a water-jacket having a hot water and/or steam outlet and surrounding said combustion chamber for purposes of heating water in said water-jacket and conducting said hot water and/or steam from the hot-water/steam outlet of said water-jacket to said cyclone separator along with the fluid-containing metal chips entrained in a gas entering thereinto.

42. The process of claim 24, including the step of exhausting gaseous products of combustion from said combustion chamber and conducting the same to and introducing the same into said continuous centrifuge for the heating and entrainment of starting metal chips therein, and wherein the hot water and/or steam is introduced into both said continuous centrifuge and said cyclone separator.

43. The process of claim 25, including the step of exhausting gaseous products of combustion from said combustion chamber and conducting the same to and introducing the same into said continuous centrifuge for the heating and entrainment of starting metal chips therein, and wherein the hot water and/or steam is introduced into both said continuous centrifuge and said cyclone separator.

44. In a metal chip drying apparatus, the combination comprising
cyclone separator means having a wall, said wall being of heat-conducting material and having inner and outer surfaces, and having inlet means for the entry into said cyclone separator means of gas-entrained metal chips,
outlet means for the exit of dried chips from said cyclone separator means,
outlet means at the opposite end of said cyclone separator means for the exit of exhaust gases therefrom,
combustion chamber means about the outer surface of the wall of said cyclone separator means for the combustion of fuel therein,
inlet means into said combustion chamber means for the entry of heat and flame thereinto,
burner means associated with said inlet means into said combustion chamber means and with fuel source means,
outlet means for exit of gaseous products of combustion from said combustion chamber means,
jacketed rotary drum dryer or jacketed screw conveyor means, associated with said outlet means for the exit of dried chips from said cyclone separator means, and having a jacket provided with inlet means thereinto,
conduit means communicating between said outlet means of said combustion chamber means for the exit of gaseous products of combustion therefrom and said inlet means into said jacket means jacketing said rotary drum dryer or screw conveyor.

45. The combination of claim 44, also comprising continuous centrifuge means including
chip inlet means and
discharge outlet means for exit of gas-entrained chips from said centrifuge means, together with
associated conduit means, which associated conduit means
is connected from said discharge outlet means to said inlet means into said cyclone separator means.

46. The combination of claim 45, also comprising
conduit means associated with said combustion chamber outlet means and
in communication with said chip inlet means of said continuous centrifuge means,
thereby forming a circuit between said combustion chamber means through said outlet means thereof and continuous centrifuge means via said chip inlet means of said continuous centrifuge means and
thence out of said continuous centrifuge means via said discharge outlet means thereof and associated conduit means into said cyclone separator means via said inlet means thereof, and
wherein said jacketed rotary drum dryer or said jacketed screw conveyor comprises a jacket having an entry port thereinto which is in communication with said conduit means from said combustion chamber outlet means and also having an outlet port therein which is in communication with conduit means communicating with said chip inlet means of said continuous centrifuge means, the said jacket thereby forming a part of said conduitry circuit.

47. A process for the production of dry metal chips by the removal of fluid therefrom comprising the following steps:
entraining fluid-containing metal chips in a gas,
providing a cyclone separator having a wall, said wall being of heat-conductive material and comprising internal and external surfaces,
applying heat to a substantial portion of the external surface of said wall of said cyclone separator to produce a fluid-vaporizing temperature on the internal surface of said wall,
introducing said gas with entrained fluid-containing chips into said cyclone separator,
causing said fluid-containing chips to contact the internal surface of said heated wall of said cyclone separator thereby
purging and vaporizing fluid from said chips,
exhausting hot gases including entrained vaporized fluid purged from said chips from one end of said cyclone separator,
exiting dried metal chips from the other end of said cyclone separator,
providing said heat to said cyclone separator wall external surface by the combustion of combustible material in a combustion chamber surrounding the same,
exhausting gaseous products of combustion from said combustion chamber and conducting the same to and introducing the same into the jacket of a jacketed rotary drum dryer or a jacketed screw conveyor, thereby heating the same,
introducing said dried metal chips from said cyclone separator into said rotary drum dryer or screw conveyor and further drying the same therein by means of the heat produced in the jacket thereof by the gaseous products of combustion from said combustion chamber.

48. The process of claim 47, wherein extractable fluid is removed from the starting metal chips centrifugally in a continuous centrifuge before introduction of the gas containing entrained chips into the cyclone separator, and wherein gas entraining said metal chips from said continuous centrifuge is conducted from said continuous centrifuge into said cyclone separator.

49. The process of claim 48, including the step of exhausting gaseous products of combustion from said combustion chamber and conducting the same to and introducing the same into said continuous centrifuge for the heating and entrainment of starting metal chips therein, and wherein the gaseous products of combustion from said combustion chamber are first conducted into the jacket of said rotary drum dryer or jacketed screw conveyor for heating of the same and thence out of said jacket and into said continuous centrifuge.

50. A process for the production of dry metal chips by the removal of fluid therefrom comprising the following steps:

entraining fluid-containing metal chips in a gas, providing a cyclone separator having a wall, said wall comprising internal and external surfaces, heating a substantial portion of said wall of said cyclone separator to fluid-vaporizing temperature, introducing said gas with entrained fluid-containing chips into said cyclone separator, causing said fluid-containing chips to contact the internal surface of said heated wall of said cyclone separator thereby purging and vaporizing fluid from said chips, exhausting hot gases including entrained vaporized fluid purged from said chips from one end of said cyclone separator, and exiting dried metal chips from the other end of said cyclone separator, heating said wall of said cyclone separator to fluid-vaporizing temperature by effecting combustion in a combustion chamber surrounding said wall of said cyclone separator, extracting extractable fluid from starting metal chips centrifugally in a continuous centrifuge, entraining said metal chips in said hot gaseous products of combustion introduced into said continuous centrifuge from said combustion chamber, conducting said gaseous products with entrained chips from said continuous centrifuge to and introducing the same into said cyclone separator, providing a jacketed rotary drum dryer or jacketed screw conveyor, using the hot gaseous products of combustion from said combustion chamber for heating of the said rotary drum dryer or screw conveyor by introducing them into the jacket thereof, introducing said dried metal chips from said cyclone separator into said rotary drum dryer or screw conveyor and further drying the same therein, and then conducting said hot gaseous products of combustion from the jacket of said rotary drum dryer or screw conveyor to and introducing them into said continuous centrifuge, thereby providing an essentially closed system.

* * * * *

UNITED STATES PATENT AND TRADEMARK OFFICE
CERTIFICATE OF CORRECTION

PATENT NO.  : 4,721,457
DATED       : January 26, 1988
INVENTOR(S) : Larry D. Areaux and Robert H. Dudley It is certified that error appears in the above-identified patent and that said Letters Patent is hereby corrected as shown below:

Col. 1, line 64; "providing" should read -- provides --
Col. 2, lines 36 & 37; delete "but which may b applied to relatively dirty chips,"
Col. 2, line 64; after "drum" insert -- dryer --
Col. 4, line 3; "flid" should read -- fluid --
Col. 4, line 11; "interal" should read -- internal --
Col. 5, line 21; "froms" should read -- from --
Col. 6, lines 39 & 40; "justaposition" should read -- juxtaposition --
Col. 8, line 32; "CA" should read -- C4 --
Col. 8, line 56; after "moisture" insert -- but also oil and/or grease. For this reason provision --
Col. 9, line 38; "solid" should read -- solids --
Col. 10, line 67; "conduit" should read -- conduitry --
Col. 12, line 12; "after" should read -- after- --
Col. 15, lines 23 & 24; "possibly" should read -- possible --
Col. 16, line 7; "* * *" should be in the middle of the column.
Col. 16, line 8; "therebyseen" should read -- thereby seen --
Col. 17, line 68; "chambermeans" should read -- chamber means --
Col. 18, line 27; after "hot" insert -- water --

Signed and Sealed this

Fourth Day of October, 1988

Attest:

DONALD J. QUIGG

*Attesting Officer*           *Commissioner of Patents and Trademarks*